(12) United States Patent
Shan et al.

(10) Patent No.: US 11,880,776 B2
(45) Date of Patent: Jan. 23, 2024

(54) GRAPH NEURAL NETWORK (GNN)-BASED PREDICTION SYSTEM FOR TOTAL ORGANIC CARBON (TOC) IN SHALE

(71) Applicant: INSTITUTE OF GEOLOGY AND GEOPHYSICS, CHINESE ACADEMY OF SCIENCES, Beijing (CN)

(72) Inventors: Xiaocai Shan, Beijing (CN); Wang Zhang, Beijing (CN); Yongjian Zhou, Beijing (CN)

(73) Assignee: INSTITUTE OF GEOLOGY AND GEOPHYSICS, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 17/992,958

(22) Filed: Nov. 23, 2022

(65) Prior Publication Data
US 2023/0162052 A1    May 25, 2023

(30) Foreign Application Priority Data
Nov. 25, 2021    (CN) .......................... 202111411640.8

(51) Int. Cl.
G06N 5/022    (2023.01)
G06N 3/08    (2023.01)

(52) U.S. Cl.
CPC .............. *G06N 5/022* (2013.01); *G06N 3/08* (2013.01)

(58) Field of Classification Search
CPC .................................. G06N 3/08; G06N 5/022
See application file for complete search history.

(56) References Cited

U.S. PATENT DOCUMENTS

2021/0271965 A1*    9/2021    Malynin ................ G06N 3/042

FOREIGN PATENT DOCUMENTS

| CN | 107436452 A |   | 12/2017 |           |
|----|-------------|---|---------|-----------|
| CN | 107703561 A | * | 2/2018  | G01V 11/00 |

(Continued)

OTHER PUBLICATIONS

Elkatatny, "A Self-Adaptive Artificial Neural Network Technique to Predict Total Organic Carbon (TOC) Based on Well Logs", Dec. 4, 2018, Arabian Journal for Science and Engineering 44:6127-6137 (Year: 2018).*

(Continued)

*Primary Examiner* — Alexey Shmatov
*Assistant Examiner* — Sally T. Ley
(74) *Attorney, Agent, or Firm* — Bayramoglu Law Offices LLC

(57) ABSTRACT

A graph neural network (GNN)-based prediction system for total organic carbon (TOC) in shale solves the problem that the existing shale TOC prediction method cannot fully analyze the complex nonlinear relationship between all logging curves and TOC. The prediction system adopts a method including: acquiring and preprocessing a plurality of logging curves of a target well location in a target shale bed to acquire a plurality of standardized logging curves, windowing the plurality of standardized logging curves, and inputting the windowed logging curves and weight matrix into a trained GNN-based TOC prediction network to acquire TOC of the target well location. The prediction system inputs the plurality of logging curves as correlative multi-dimensional dynamic graph data for analysis and can acquire the complex nonlinear relationship between the logging curves and TOC, thus improving the prediction accuracy of TOC.

4 Claims, 3 Drawing Sheets

(56) References Cited

FOREIGN PATENT DOCUMENTS

| | | | | | |
|---|---|---|---|---|---|
| CN | 111058840 | A | * | 4/2020 | ............ G01V 11/00 |
| CN | 111058840 | A | | 4/2020 | |
| CN | 106568918 | B | | 7/2020 | |
| CN | 111580179 | A | * | 8/2020 | ............ G01V 11/00 |
| CN | 108171376 | B | | 9/2020 | |
| CN | 112360411 | A | | 2/2021 | |
| CN | 110501744 | B | | 6/2021 | |

OTHER PUBLICATIONS

Zhu, et al. "Prediction of total organic carbon content in shale reservoir based on a new integrated hybrid neural network and conventional well logging curves"; J. Geophys. Eng. 15 (2018) 1050-1061 (Year: 2018).*

Varma, "Stability and Generalization of Graph Convolutional Neural Networks"; KDD '19, Aug. 8, 2019, Anchorage, AK, USA (Year: 2019).*

Rahaman, et al. "Feature Selection-Based Artificial Intelligence Techniques for Estimating Total Organic Carbon from Well Logs" 2019, Journal of Physics: Conference Series, IOP Publishing) (Year: 2019).*

Zhou "Graph neural networks: A review of methods and applications", AI Open vol. 1, 2020, pp. 57-81 (Year: 2020).*

Rahaman, et al. "Artificial Intelligence Approach for Predicting TOC From Well Logs in Shale Reservoirs: A Review", Jan. 2020, Deep Learning Techniques and Optimization Strategies in Big Data Analytics (pp. 46-77) (Year: 2020).*

Li, et al., "Spatial-Temporal Fusion Graph Neural Networks for Traffic Flow Forecasting", Mar. 6, 2021 arXiv:2012.09641v2 (Year: 2021).*

Liu, et al., "Total Organic Carbon Content Prediction in Lacustrine Shale Using Extreme Gradient Boosting Machine Learning Based on Bayesian Optimization", Oct. 2021, Geofluids, vol. 2021, Article ID 6155663 (Year: 2021).*

Wang, et al. "A New Scheme to Improve the Performance of Artificial Intelligence Techniques for Estimating Total Organic Carbon from Well Logs", Energies 2018, 11(4), 747 (Year: 2018).*

Jing, et al. Relational graph neural network for situation recognition, Pattern Recognition, vol. 108, 2020; (Year: 2020).*

Boxiong Yang, Gon-Based Graph Spatio-Temporal Network, Deep Learning Theory And Practice, 2020, pp. 147-151.

\* cited by examiner

GRAPH NEURAL NETWORK (GNN)-BASED PREDICTION SYSTEM FOR TOTAL ORGANIC CARBON (TOC) IN SHALE

CROSS REFERENCE TO THE RELATED APPLICATIONS

This application is based upon and claims priority to Chinese Patent Application No. 202111411640.8, filed on Nov. 25, 2021, the entire contents of which are incorporated herein by reference.

TECHNICAL FIELD

The present disclosure belongs to the field of geological exploration and in particular to a graph neural network (GNN)-based prediction system for total organic carbon (TOC) in shale.

BACKGROUND

Source rock evaluation is of great significance to the development of shale gas and shale oil. As an important parameter for reservoir prediction and the main indicator for evaluating the source potential in the shale gas reservoir, TOC plays an important role in source rock evaluation. Generally, TOC is measured in the laboratory by rock-eval (RE) pyrolysis. However, due to the limited number of core samples and the high cost of experiments, there are usually little data.

It has been confirmed that conventional wireline logging (such as acoustic logging, gamma-ray logging, resistivity logging, and density logging) parameters are related to TOC. Therefore, the relationship between the TOC of core samples and wireline logging parameters can be established to predict continuous TOC.

In the Chinese patent application CN110501744B, only the P-wave impedance (PI) data is used, and other relevant logging parameters are ignored. In addition, the statistical equation involves model-driven analysis using a binomial fitting, and due to the limited characterization ability, the model cannot characterize the complex nonlinear relationship between TOC and logging parameters.

In the Chinese patent application CN108171376B, the included angle cosine is used as the similarity measure, and the simple linear modeling method is not sufficient to characterize the complex nonlinear relationship between TOC and various logging parameters.

In Chinese patent application CN106568918B, the mathematical relationship model uses monomial fitting, which is not sufficient to characterize the complex nonlinear relationship between TOC and various logging parameters.

SUMMARY

To solve the above problems in the prior art, that is, the existing shale TOC prediction method cannot fully analyze the complex nonlinear relationship between all logging curves and TOC, the present disclosure provides a GNN-based prediction system for TOC in shale. The prediction system includes an operation terminal, a data terminal, and a data processing server that are connected through a communication link.

The operation terminal is configured to select logging curves of a target well location in a target shale bed from the data terminal and input or select a weight matrix between the logging curves.

One or more data terminals are configured to store logging curves of different well locations.

The data processing server is configured to acquire the logging curves selected by the operation terminal, acquire the TOC of the target well location through a trained GNN model, and transmit the TOC to the operation terminal.

The logging curves refer to formation response signals acquired during the drilling and development of shale gas or shale oil well and include a radioactive uranium logging curve, a radioactive thorium logging curve, a radioactive potassium logging curve, an acoustic velocity logging curve, a compensated neutron logging curve, a density logging curve, a lithology density logging curve, a deep investigation double lateral resistivity logging curve, a shallow investigation double lateral resistivity logging curve, and a gamma logging curve.

A method for acquiring the TOC of the target well location includes: preprocessing based on a plurality of logging curves to acquire a plurality of standardized logging curves, windowing the plurality of standardized logging curves, and inputting windowed logging curves and a preset weight matrix between the logging curves into a trained GNN-based TOC prediction network to acquire the TOC of the target well location.

The method for acquiring the TOC of the target well location further includes a first step of analyzing sensitivity values of the logging curves, specifically including:

S400A: carrying out, by a trained graph convolutional neural network (GCNN), gradient back-propagation based on the TOC of the target well location to acquire the sensitivity value of each logging curve to predicted TOC.

The method for acquiring the TOC of the target well location further includes a second step of analyzing sensitivity values of the logging curves, specifically including:

S400B: dividing different standardized logging curves into different logging curve combinations, training a GNN-based TOC prediction network corresponding to the different logging curve combinations to acquire TOC predicted by the different logging curve combinations, comparing the TOC predicted by the different logging curve combinations with measured TOC of a TOC measuring point of a known well location, and analyzing the sensitivity values of the different logging curve combinations to the predicted TOC.

In some preferred implementations, the trained GNN-based TOC prediction network is acquired through training by the following steps:

A100: acquiring standardized logging curves of the known well location;

A200: acquiring a plurality of TOC measuring points of the known well location by analyzing the TOC of a core extracted during drilling of the known well location and acquiring the measured TOC;

A300: windowing the logging curve according to the position of the TOC measuring point of the known well location, where the depth corresponding to the center of a data window after windowing is the position of the TOC measuring point;

A400: presetting the weight matrix between the logging curves;

A500: dividing the windowed logging curves, the weight matrix between the logging curves, and the measured TOC into a training set and a verification set;

A600: inputting the training set and the weight matrix between the logging curves into a GNN-based TOC prediction network; extracting, by a graph-based convolution kernel of the logging curves, a characteristic of a training sample; and outputting predicted TOC of the training set based on the characteristic of the training sample;

A700: calculating a loss function of the training set based on the predicted TOC of the training set and the measured TOC and optimizing a network parameter by a stochastic gradient descent algorithm;

A800: inputting, in each iteration, the verification set and the weight matrix into the GNN-based TOC prediction network, and outputting the predicted TOC of the verification set; and calculating a loss function of the verification set based on the predicted TOC of the verification set and the measured TOC; and A900: repeating steps A600 to A800 until the loss function of the training set is lower than a preset threshold or the loss function of the verification set shows an upward trend to acquire the trained GNN-based TOC prediction network.

In some preferred implementations, the graph-based convolution kernel includes a plurality of spatial-temporal convolution blocks.

The spatial-temporal convolution block includes two spatial-temporal-convolution blocks (ST-Cony Blocks) and a fully connected output layer that are sequentially connected.

Each of the ST-Cony Blocks includes a temporal gated-convolution (Temporal Gated-Cony) block, a spatial graph-convolution (Spatial Graph-Cony) block, and a Temporal Gated-Cony block that are sequentially connected.

For each Temporal Gated-Cony block, a 1-dimensional causal convolution is implemented through a gated linear unit (GLU).

In some preferred implementations, the loss function is preferably implemented by a mean squared error (MSE) or a squared error loss (L2 loss).

In some preferred implementations, the preprocessing includes removing an abnormal value in the logging curves and normalizing.

In some preferred implementations, a factor that reduces a prediction accuracy is removed according to the sensitivity value of each logging curve to the predicted TOC, an optimal logging curve combination is selected, and the optimal logging curve combination and the weight matrix between the logging curves are input into the trained GNN-based TOC prediction network to acquire the TOC of the target well location.

Another aspect of the present disclosure provides a GNN-based prediction system for TOC in shale, including a logging curve acquisition module, a data preprocessing module, and a TOC prediction module.

The logging curve acquisition module is configured to acquire a plurality of logging curves of a target well location in a target shale bed. The logging curves refer to formation response signals acquired during the drilling and development of shale gas or shale oil well and include ten logging curves, namely, a radioactive uranium logging curve, a radioactive thorium logging curve, a radioactive potassium logging curve, an acoustic velocity logging curve, a compensated neutron logging curve, a density logging curve, a lithology density logging curve, a deep investigation double lateral resistivity logging curve, a shallow investigation double lateral resistivity logging curve, and a gamma logging curve.

The data preprocessing module is configured to preprocess the plurality of logging curves to acquire a plurality of standardized logging curves.

The TOC prediction module is configured to window the plurality of standardized logging curves and input windowed logging curves and a preset weight matrix between the logging curves into a trained GNN-based TOC prediction network to acquire TOC of the target well location.

The present disclosure has the following beneficial effects:

(1) In the present disclosure, the GNN-based prediction system for TOC in shale inputs the plurality of logging curves as correlative multi-dimensional dynamic graph data into the GNN for analysis. The GNN-based prediction system for TOC in shale makes full use of all available logging parameters and can accurately acquire the relationship between the logging curves and TOC.

(2) In the present disclosure, the GNN-based prediction system for TOC in shale analyzes all logging parameters through the GNN model, analyzes the dynamic relationship between the logging nodes in a distributed manner, and automatically learns the TOC prediction mode.

(3) The GNN model of the present disclosure is a data-driven model, which can maximally mine the dynamic mapping relationship of nonlinear functions, thereby breaking through the limitations brought by the formalized designation of models by humans.

(4) In the present disclosure, the GNN-based prediction system for TOC in shale infers the correlation degree between a plurality of logging parameters and TOC and can carry out gradient back-propagation of the trained model or combine different logging curves to analyze the modeling effect. In this way, the GNN-based prediction system for TOC in shale eliminates the factors that reduce the prediction accuracy and ignores irrelevant factors, thus improving the robustness and interpretability.

BRIEF DESCRIPTION OF THE DRAWINGS

Other features, objectives, and advantages of the present disclosure will become more apparent upon reading the detailed description of the non-restrictive embodiments and referring to the following drawings.

DETAILED DESCRIPTION OF THE EMBODIMENTS

Figure 1:
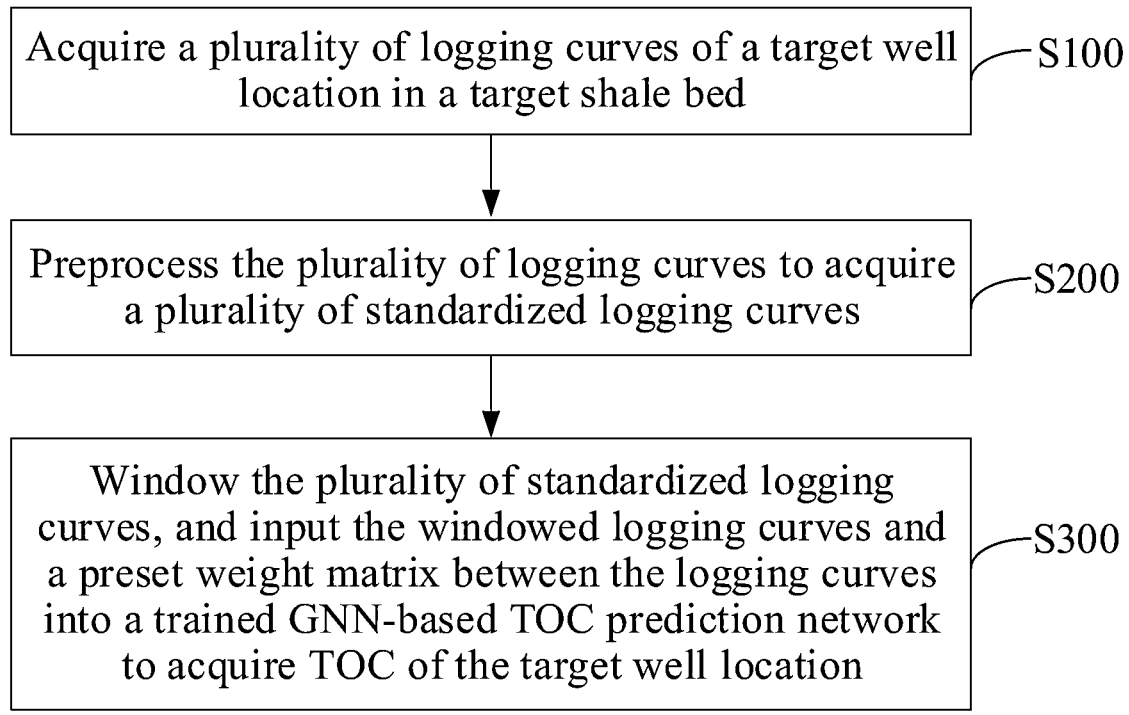
FIG. 1 is a flowchart of acquiring TOC of a target well location by a GNN-based prediction system for TOC in shale according to an embodiment of the present disclosure.

The present disclosure will be further described in detail below in conjunction with the drawings and embodiments. It should be understood that the specific embodiments described herein are intended to explain the present disclosure, rather than to limit the present disclosure. It should also be noted that, for the convenience of description, only the parts related to the present disclosure are shown in the drawings.

It should be noted that the embodiments in the present disclosure and features in the embodiments may be combined if no conflict occurs. The present disclosure will be described in detail below by referring to the drawings and embodiments.

The present disclosure provides a GNN-based prediction system for TOC in shale. The present system inputs a plurality of logging curves as correlative multi-dimensional dynamic graph data into the GNN for analysis. The present disclosure can accurately acquire the relationship between the logging curves and TOC.

The prediction system includes an operation terminal, a data terminal, and a data processing server that are connected through a communication link. The operation terminal is configured to select logging curves of a target well location in a target shale bed from the data terminal and input or select a weight matrix between the logging curves. One or more data terminals are configured to store logging curves of different well locations. The data processing server is configured to acquire the logging curves selected by the operation terminal, acquire the TOC of the target well location through a trained GNN model, and transmit the TOC to the operation terminal.

For the convenience of description, a data processing solution in a data processing server is described in detail in the following steps S100 to S300.

S100. A plurality of logging curves of a target well location in a target shale bed are acquired. In this embodiment, the logging curves refer to formation response signals acquired during the drilling and development of shale gas or shale oil well and include ten logging curves, namely, a radioactive uranium logging curve, a radioactive thorium logging curve, a radioactive potassium logging curve, an acoustic velocity logging curve, a compensated neutron logging curve, a density logging curve, a lithology density logging curve, a deep investigation double lateral resistivity logging curve, a shallow investigation double lateral resistivity logging curve, and a gamma logging curve.

S200. The plurality of logging curves are preprocessed to acquire a plurality of standardized logging curves.

In this embodiment, the preprocessing includes removing an abnormal value in the logging curves and normalizing.

Figure 3:
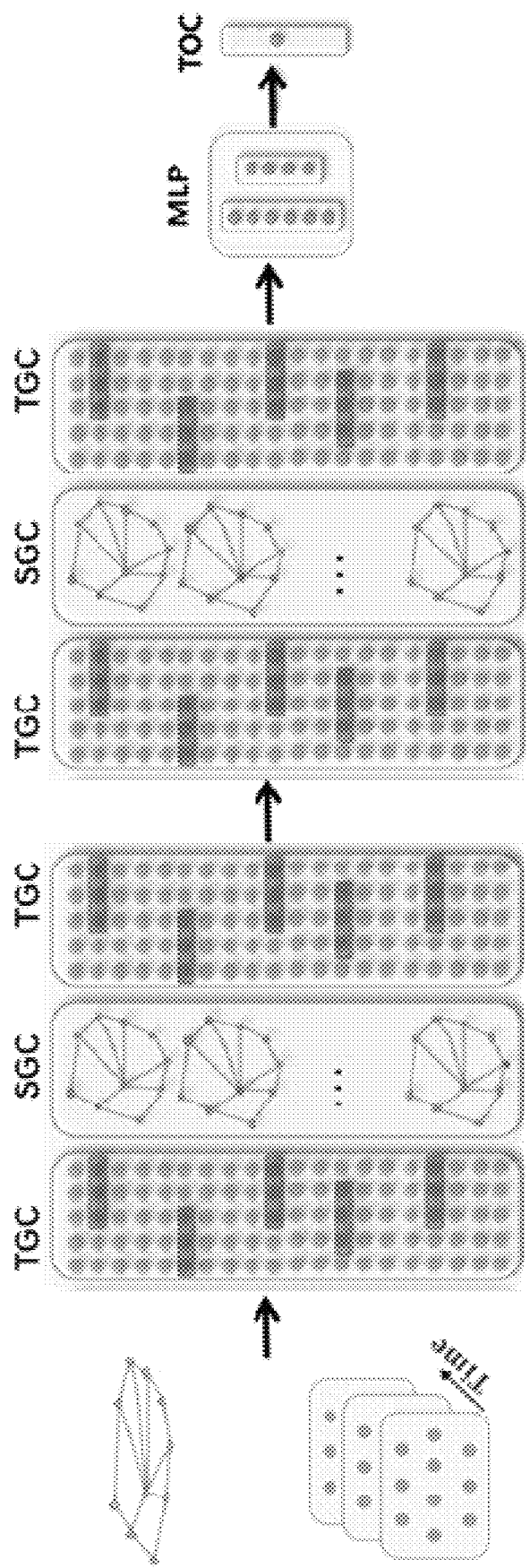
FIG. 3 is a schematic diagram of a GCNN according to an embodiment of the present disclosure.

S300. The plurality of standardized logging curves are windowed and are input together with a preset weight matrix between the logging curves into a trained GNN-based TOC prediction network to acquire the TOC of the target well location. The principle of the GNN-based prediction network is shown in FIG. 3. In FIG. 3, the symbol in the upper left corner denotes the weight matrix, and the symbol in the lower left corner denotes the time series of inputting 10 logging curves after windowing. TGC denotes time gain compensation and SGC denotes side gain compensation.

In this embodiment, the trained GNN-based TOC prediction network is acquired through training by the following steps:

A100. Standardized logging curves of the known well location are acquired.

A200. A plurality of TOC measuring points of the known well location are acquired by analyzing the TOC of a core extracted during drilling of the known well location, and the measured TOC is acquired. Generally, TOC is measured in the laboratory by rock-eval (RE) pyrolysis as the main indicator for evaluating the hydrocarbon generation potential of source rocks in the shale gas reservoir. However, the number of core samples is limited and the experiments are costly. In this context, the method of the present disclosure for acquiring TOC by logging curves can significantly reduce the exploration cost.

A300. The logging curve is windowed according to the position of the TOC measuring point of the known well location, where the depth corresponding to the center of a data window after windowing is the position of the TOC measuring point.

A400. The weight matrix between the logging curves is preset. In this embodiment, in the weight matrix, the weight for characterizing the relationship among gamma ray (GR), uranium (U), thorium (TH), and potassium (K) in gamma-ray logging is large (for example, 1). The weight for characterizing the relationship among interval transit time DT, compensated neutron logging (CNL), density (DEN), and photoelectric (PE) in porosity logging is large (for example, 1). The weight for characterizing the relationship between deep investigation double lateral resistivity logging (RD) and shallow investigation double lateral resistivity logging (RS) in resistivity logging is large (for example, 1). The weight for characterizing the relationship among gamma-ray logging, porosity logging, and resistivity logging is small (for example, 0.1). In this embodiment, the weight is set to distinguish the differences between the logging curves representing different physical properties, and other values can also be selected. For example, the weight for characterizing the relationship among gamma-ray logging, porosity logging, and resistivity logging can be set to 1/n of other parameters, n being a positive number greater than or equal to 2. The weight for characterizing gamma-ray logging, the weight for characterizing porosity logging, and the weight for characterizing resistivity logging can also be set as different parameters.

A500. The windowed logging curves, the weight matrix between the logging curves, and the measured TOC are divided into a training set and a verification set. In this embodiment, a depth corresponding to a window center indicates a core position where the TOC needs to be predicted.

Figure 4:
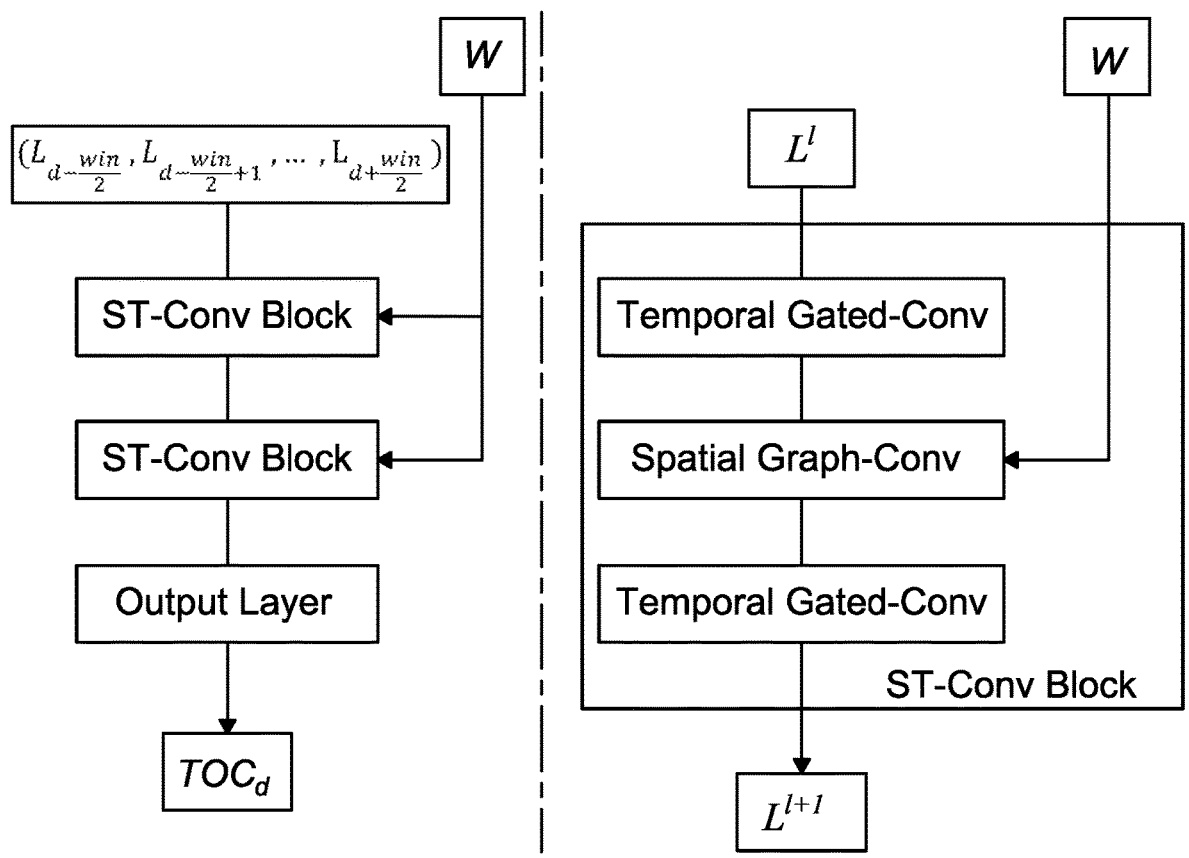
FIG. 4 is a schematic diagram of a parameter detail of the GCNN according to an embodiment of the present disclosure.

In this embodiment, the graph-based convolution kernel includes a plurality of spatial-temporal convolution blocks, as shown in FIG. 4.

The spatial-temporal convolution block includes two spatial-temporal-convolution blocks (ST-Cony Blocks) and a fully connected output layer that are sequentially connected.

Each of the ST-Cony Blocks includes a temporal gated-convolution (Temporal Gated-Cony) block, a spatial graph-convolution (Spatial Graph-Cony) block, and a Temporal Gated-Cony block that are sequentially connected.

For each Temporal Gated-Cony block, a 1-dimensional causal convolution is implemented through a gated linear unit (GLU).

A600. The training set and the weight matrix between the logging curves are input into a GNN-based TOC prediction network. A characteristic of a training sample is extracted by a graph-based convolution kernel of the logging curves, and the predicted TOC of the training set is output based on the characteristic of the training sample.

A700. A loss function of the training set is calculated based on the predicted TOC of the training set and the measured TOC, and a network parameter is optimized by a stochastic gradient descent algorithm.

In this embodiment, the loss function is preferably implemented by a mean squared error (MSE) or a squared error loss (L2 loss).

A800. In each iteration, the verification set and the weight matrix are input into the GNN-based TOC prediction network, and the predicted TOC of the verification set is output.

A loss function of the verification set is calculated based on the predicted TOC of the verification set and the measured TOC.

A900. Steps A600 to A800 are repeated until the loss function of the training set is lower than the preset threshold or the loss function of the verification set shows an upward trend to acquire the trained GNN-based TOC prediction network.

In this embodiment, the method for acquiring the TOC of the target well location further includes a first step of analyzing the sensitivity values of the logging curves, specifically including:

S400A. Gradient back-propagation is carried out based on the TOC of the target well location to acquire the sensitivity value of each logging curve to the predicted TOC.

In this step, the sensitivity values are sorted from large to small, and the first N logging curves sorted based on their sensitivity values are selected as a first logging curve combination. When the TOC of other target well locations is predicted, the first logging curve combination and the preset weight matrix between the logging curves are input into the trained GNN-based TOC prediction network to acquire the final TOC.

In this embodiment, the factor that reduces the prediction accuracy is eliminated according to the sensitivity value of each logging curve to the predicted TOC, and the acquired logging curve combination can be taken as the first logging curve combination (which can be used as the optimal logging curve combination). The first logging curve combination and the weight matrix between the logging curves are input into the trained GNN-based TOC prediction network to acquire the TOC of the target well location.

In this embodiment, the method of analyzing the sensitivity values of the logging curves further includes a second step of analyzing sensitivity values of the logging curves, specifically including:

S400B: Different standardized logging curves are divided into different logging curve combinations. A GNN-based TOC prediction network corresponding to the different logging curve combinations is trained according to steps A100 to A900, to acquire TOC predicted by the different logging curve combinations. The TOC predicted by the different logging curve combinations is compared with the measured TOC of a TOC measuring point of a known well location. The sensitivity values of the different logging curve combinations to the predicted TOC are analyzed.

In this embodiment, the method for analyzing the sensitivity values of the logging curves may further include a third step of analyzing the sensitivity values of the logging curves, specifically including:

The ten logging curves are combined in any number to form a plurality of second logging curve combinations. The second logging curve combinations are input into the trained GNN-based TOC prediction network to acquire the sensitivity values of the various second logging curve combinations to the predicted TOC.

When the TOC of other target well locations is predicted, a second logging curve combination with the highest sensitivity value to the predicted TOC is selected. The second logging curve combination and the preset weight matrix between the logging curves are input into the trained GNN-based TOC prediction network to acquire the final TOC.

Figure 2:
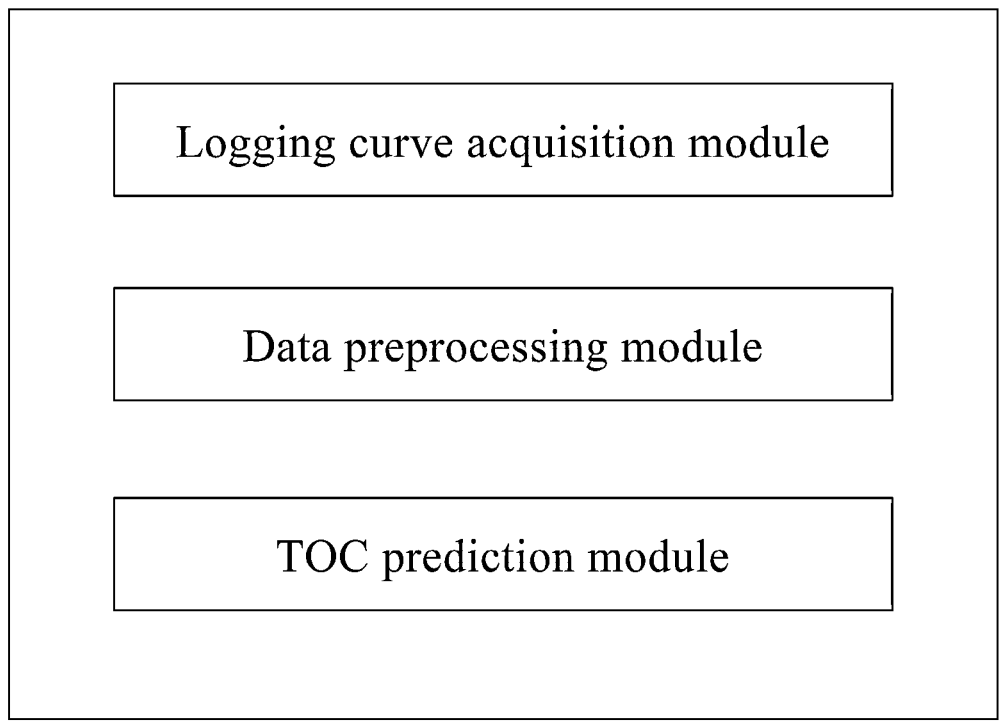
FIG. 2 is a block diagram of the GNN-based prediction system for TOC in shale according to a second embodiment of the present disclosure.

A second embodiment of the present disclosure provides a GNN-based prediction system for TOC in shale. As shown in FIG. 2, the prediction system includes a logging curve acquisition module, a data preprocessing module, and a TOC prediction module.

The logging curve acquisition module is configured to acquire a plurality of logging curves of a target well location in a target shale bed, where the logging curves refer to formation response signals acquired during the drilling and development of shale gas or shale oil well, and include ten logging curves, namely, a radioactive uranium logging curve, a radioactive thorium logging curve, a radioactive potassium logging curve, an acoustic velocity logging curve, a compensated neutron logging curve, a density logging curve, a lithology density logging curve, a deep investigation double lateral resistivity logging curve, a shallow investigation double lateral resistivity logging curve, and a gamma logging curve.

The data preprocessing module is configured to preprocess the plurality of logging curves to acquire a plurality of standardized logging curves.

The TOC prediction module is configured to window the plurality of standardized logging curves and input windowed logging curves and a preset weight matrix between the logging curves into a trained GNN-based TOC prediction network to acquire TOC of the target well location.

Those skilled in the art should clearly understand that, for convenience and brevity of description, reference is made to corresponding processes in the above method embodiments for specific working processes and related description of the system, and details are not described herein again.

It should be noted that the GNN-based prediction system for TOC in shale provided in the above embodiments is described by dividing the functions into the above functional modules as an example. In practical applications, the above functions can be completed by different functional modules as required, that is, the modules or steps in the embodiments of the present disclosure are further decomposed or combined. For example, the modules of the above embodiments may be combined into one module or may be further divided into a plurality of sub-modules to complete all or part of the functions described above. The names of the modules and steps involved in the embodiments of the present disclosure are only for distinguishing each module or step and should not be regarded as improper limitations on the present disclosure.

A third embodiment of the present disclosure provides an electronic device, which includes at least one processor and a memory communicatively connected to the at least one processor, where the memory stores an instruction executable by the processor, and the instruction is executed by the processor to implement the above GNN-based prediction method for TOC in shale.

A fourth embodiment of the present disclosure proposes a computer-readable storage medium, which stores a computer instruction, where the computer instruction is executed by a computer to implement the above GNN-based prediction method for TOC in shale.

Those skilled in the art should understand that, for convenience and brevity of description, reference is made to corresponding processes in the above method embodiments for specific working processes and related description of the storage device and processing device, and details are not described herein again.

Particularly, according to the embodiments of the present disclosure, the process described above as shown in the flowchart may be implemented as a computer software program. For example, an embodiment of the present disclosure includes a computer program product including a computer program stored in a computer-readable medium. The computer program includes program code for executing the method shown in the flowchart. In this embodiment, the computer program may be downloaded from a network using the communication part and installed and/or installed from the removable medium. When the computer program is executed by the CPU, the functions defined in the method of the present disclosure are executed. It should be noted that the computer-readable medium in the present disclosure may be a computer-readable signal medium, a computer-readable storage medium, or a combination thereof. The computer-readable storage medium may be, for example, but not limited to, electrical, magnetic, optical, electromagnetic, infrared, or semiconductor systems, apparatuses, devices, or any combination thereof. More specific examples of the computer-readable storage medium may include, but are not limited to, an electrical connector with one or more wires, a portable computer magnetic disk, a hard disk, a RAM, a ROM, an erasable programmable read-only memory (EPROM or flash memory), an optical fiber, a portable compact disk read-only memory (CD-ROM), an optical storage device, a magnetic storage device, or any proper combination thereof. In the present disclosure, the computer-readable storage medium may be any tangible medium including or storing a program, and the program may be used by or used in combination with an instruction execution system, apparatus, or device. In the present disclosure, the computer-readable signal medium may include a data signal propagated in a baseband or propagated as a part of a carrier and carries computer-readable program code. The propagated data signal may be in various forms, including but not limited to, an electromagnetic signal, an optical signal, or any suitable combination thereof. The computer-readable signal medium may alternatively be any computer-readable medium except the computer-readable storage medium. The computer-readable medium may send, propagate, or transmit a program used by or used in combination with an instruction execution system, apparatus, or device. The program code contained on the computer-readable medium may be transmitted using any suitable medium, including, but not limited to, wireless, wire, optical fiber, RF, or any suitable combination thereof.

The computer program code for executing the operations in the present disclosure may be compiled by using one or more program design languages or a combination thereof. The programming languages include object-oriented programming languages, such as Java, Smalltalk, and CC++, and conventional procedural programming languages, such as C or similar programming languages. The program code may be executed fully on a user computer, executed partly on a user computer, executed as an independent software package, executed partly on a user computer and partly on a remote computer, or executed fully on a remote computer or a server. When a remote computer is involved, the remote computer may be connected to the user computer via any type of network including a LAN or a wide area network (WAN) or may be connected to an external computer (for example, connected via the Internet by using an Internet service provider).

The flowcharts and block diagrams in the accompanying drawings illustrate system architectures, functions, and operations that may be implemented by the system, method, and computer program product according to the embodiments of the present disclosure. In this regard, each block in the flowcharts or block diagrams may represent a module, a program segment, or a part of code, and the module, the program segment, or the part of code includes one or more executable instructions for implementing specified logic functions. It should also be noted that, in some alternative implementations, the functions marked in the blocks may alternatively be performed in an order different from that marked in the drawings. For example, two successively shown blocks may be executed in parallel substantially or may be executed in reverse order sometimes, depending on the functions involved. It should also be noted that each block in the block diagrams and/or flowcharts and combinations of the blocks in the block diagrams and/or flowcharts may be implemented by a dedicated hardware-based system for executing specified functions or operations or may be implemented by a combination of dedicated hardware and computer instructions.

Terms such as "first" and "second" are intended to distinguish between similar objects, rather than describe or indicate a specific order or sequence.

Terms "include", "comprise", or any other variations thereof are intended to cover non-exclusive inclusions, such that a process, a method, an article, or a device/apparatus including a series of elements not only includes those elements but also includes other elements that are not explicitly listed or also includes inherent elements of the process, the method, the article or the device/apparatus.

The technical solutions of the present disclosure are described by referring to the preferred implementations shown in the accompanying drawings. Those skilled in the art should understand that the protection scope of the present disclosure is not limited to these specific implementations. Those skilled in the art can make equivalent changes or substitutions to the relevant technical features without departing from the principles of the present disclosure, and the technical solutions after these changes or substitutions should fall within the protection scope of the present disclosure.

What is claimed is:

1. A graph neural network (GNN)-based prediction system for total organic carbon (TOC) in shale, comprising an operation terminal, a data terminal, and a data processing server, wherein the operation terminal, the data terminal and the data processing server are connected through a communication link, wherein the operation terminal is configured to select logging curves of a target well location in a target shale bed from the data terminal and input or select a weight matrix between the logging curves;

one or more data terminals are configured to store logging curves of different well locations;

the data processing server is configured to acquire the logging curves selected by the operation terminal, acquire TOC of the target well location through a trained GNN model, and transmit the TOC to the operation terminal;

the logging curves refer to formation response signals acquired during drilling and development of a shale gas or shale oil well, and the logging curves comprise a radioactive uranium logging curve, a radioactive thorium logging curve, a radioactive potassium logging curve, an acoustic velocity logging curve, a compensated neutron logging curve, a density logging curve, a lithology density logging curve, a deep investigation double lateral resistivity logging curve, a shallow investigation double lateral resistivity logging curve, and a gamma logging curve;

a method for acquiring the TOC of the target well location comprises: preprocessing a plurality of logging curves to acquire a plurality of standardized logging curves, windowing the plurality of standardized logging curves, and inputting windowed logging curves and a preset weight matrix between the logging curves into a trained GNN-based TOC prediction network to acquire the TOC of the target well location;

the method for acquiring the TOC of the target well location further comprises a first step of analyzing sensitivity values of the logging curves, comprising:

S400A: carrying out, by a trained graph convolutional neural network (GCNN), gradient back-propagation based on the TOC of the target well location to acquire a sensitivity value of each of the logging curves to predicted TOC;

the method for acquiring the TOC of the target well location further comprises a second step of analyzing the sensitivity values of the logging curves, comprising:

S400B: dividing the plurality of standardized logging curves into a plurality of combinations of logging curves; training a GNN-based TOC prediction network corresponding to the plurality of combinations of logging curves to acquire TOC predicted by the plurality of combinations of logging curves; comparing the TOC predicted by the plurality of combinations of logging curves with measured TOC of a TOC measuring point of a known well location; and analyzing sensitivity values of the plurality of combinations of logging curves to the predicted TOC to select a combination of logging curves of the plurality of combinations of logging curves with a highest sensitivity value to the predicted TOC and inputting the selected combination of logging curves into the GNN-based TOC prediction network to acquire a final TOC, wherein the trained GNN-based TOC prediction network is acquired through training by the following steps:

A100: acquiring standardized logging curves of the known well location;

A200: acquiring a plurality of TOC measuring points of the known well location by analyzing TOC of a core extracted during drilling of the known well location and acquiring the measured TOC;

A300: windowing the logging curve according to a position of the TOC measuring point of the known well location, wherein a depth corresponding to a center of a data window after windowing is the position of the TOC measuring point;

A400: presetting the weight matrix between the logging curves;

A500: dividing the windowed logging curves, the weight matrix between the logging curves, and the measured TOC into a training set and a verification set;

A600: inputting the training set and the weight matrix between the logging curves into a GNN-based TOC prediction network; extracting, by a graph-based convolution kernel of the logging curves, a characteristic of a training sample; and outputting predicted TOC of the training set based on the characteristic of the training sample;

A700: calculating a loss function of the training set based on the predicted TOC of the training set and the measured TOC and optimizing a network parameter by a stochastic gradient descent algorithm;

A800: inputting, in each iteration, the verification set and the weight matrix into the GNN-based TOC prediction network and outputting predicted TOC of the verification set and calculating a loss function of the verification set based on the predicted TOC of the verification set and the measured TOC; and A900: repeating steps A600 to A800 until the loss function of the training set is lower than a preset threshold or the loss function of the verification set shows an upward trend to acquire the trained GNN-based TOC prediction network; and wherein the graph-based convolution kernel comprises a plurality of spatial-temporal convolution blocks;

each of the plurality of spatial-temporal convolution blocks comprises two spatial-temporal-convolution blocks (ST-Cony Blocks) and a fully connected output layer, wherein the two ST-Cony Blocks and the fully connected output layer are sequentially connected;

each of the two ST-Cony Blocks comprises a first temporal gated-convolution (Temporal Gated-Cony) block, a spatial graph-convolution (Spatial Graph-Cony) block, and a second Temporal Gated-Cony block, wherein the first Temporal Gated-Cony block, the Spatial Graph-Cony block and the second Temporal Gated-Cony block are sequentially connected; and for each of the first Temporal Gated-Cony block and the second Temporal Gated-Cony block, a 1-dimensional causal convolution is implemented through a gated linear unit (GLU).

2. The GNN-based prediction system for TOC in shale according to claim 1, wherein the loss function is implemented by a mean squared error (MSE) or a squared error loss (L2 loss).

3. The GNN-based prediction system for TOC in shale according to claim 1, wherein the preprocessing comprises: removing an abnormal value in the logging curves and normalizing.

4. The GNN-based prediction system for TOC in shale according to claim 1, wherein a factor is removed according to the sensitivity value of each of the logging curves to the predicted TOC, wherein the factor reduces a prediction accuracy; a remaining logging curve combination is taken as an optimal logging curve combination; and the optimal logging curve combination and the weight matrix between the logging curves are input into the trained GNN-based TOC prediction network to acquire the TOC of the target well location.

* * * * *